W. H. ROBERTSON.
Milling Machine.
No. 9,307. Patented Oct. 5, 1852.
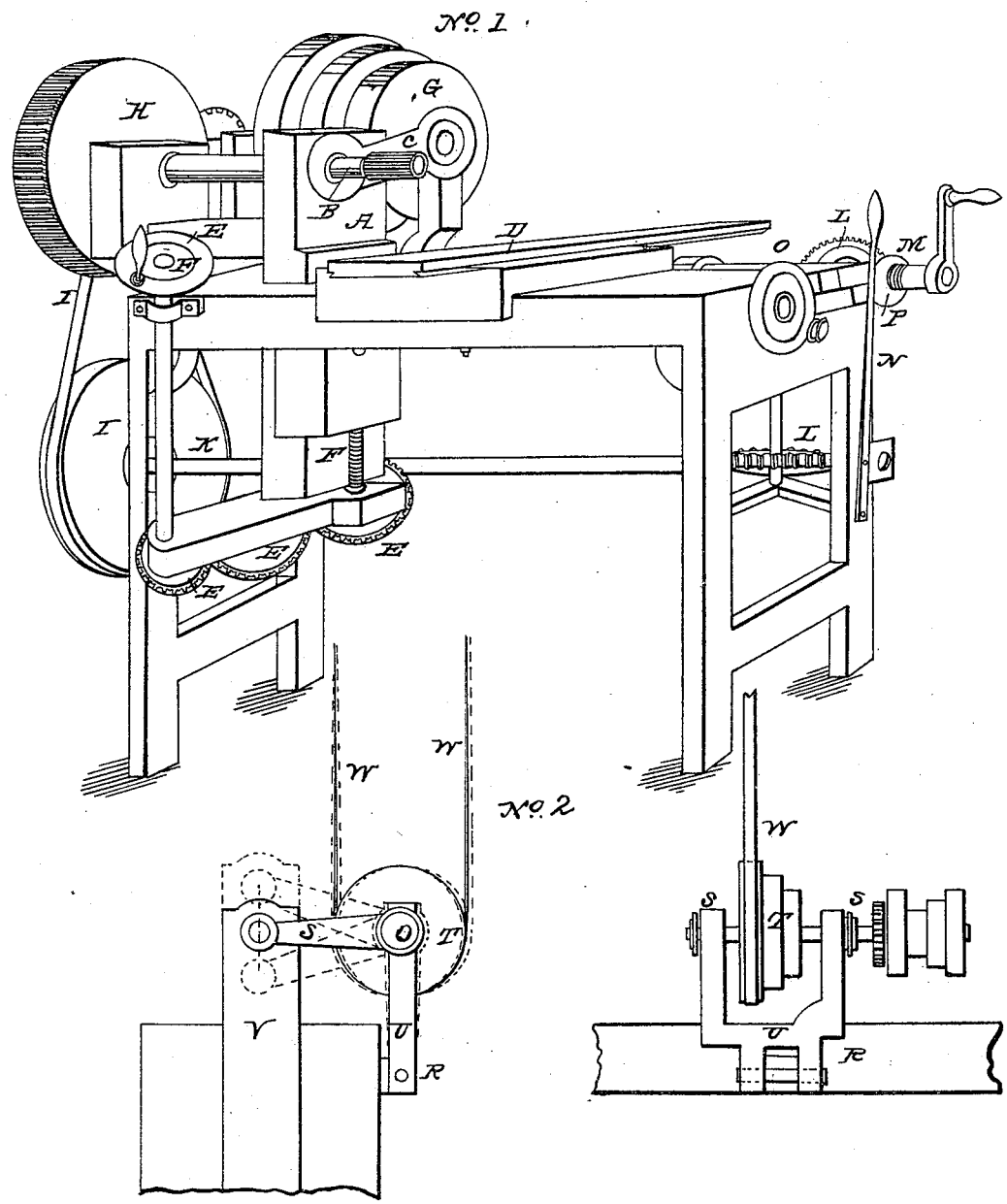

UNITED STATES PATENT OFFICE.

WILLIAM H. ROBERTSON, OF HARTFORD, CONNECTICUT.

MILLING-MACHINE.

Specification of Letters Patent No. 9,307, dated October 5, 1852.

*To all whom it may concern:*

Be it known that I, WILLIAM H. ROBERTSON, of the city of Hartford, county of Hartford, and State of Connecticut, have invented a new and useful Improvement in the Method of Constructing and Using Certain Important Parts of Metallic Milling-Machines; and I do hereby declare the following to be a full and exact description of the same, reference also to be had to the plans accompanying and forming part of this specification.

The utility and nature of my invention consists in the combination and construction of the right angle or vertically ascending and descending cutter headstock or puppet head, connected to the counter shaft and driving pulley shaft, by means of radius rods, S, attached to the outer ends of each box, O, the frame, U, of the driving pulley shaft being hung with a pivot hinge, R, at the bottom, thereby allowing a vibratory motion sufficient to conform to the vibration caused by the rising and falling of the headstock, V.

The object of this arrangement is to gear the two shafts together, and have the same at all points rightly in gear, also to avoid a vertical movement to the driving pulleys and always keep the same in gear and bands tight.

Plan No. 1 is a view of the machine showing the principal parts of the same. Plan No. 2 is the back view of the pulleys and hanging frame, and radius rods.

Plan No. 1: Letter A the movable headstock or puppet head B cutter arbor—C main arm of the arbor D traversing bed plate E gearing wheels operating on screw shaft F to cause rise and fall of headstock, when turned by crank wheel E E—G main driving pulleys H gearing wheels attached to shaft of cutter I pulley and belt operating on shaft, K, to move bed plate—L gearing wheels and rack operating on shaft, M, to regulate distance the bed plate shall move N spring to check and cause return movements of bed plate and the slow movement of shaft, O, on which is a screw after turning a given distance the eccentric lever, P, forces out the spring N and stops the movement of the bedplate.

Plan No. 2: R is the pivot hinge, S, the radius rods and dotted lines of vibration T driving pulleys U frame of pulleys V headstock, W belt.

What I claim as my invention and desire to secure by Letters Patent, is—

The construction and combination of the vertically moving cutter stock or puppet head, with the driving pulleys &c., mounted on a swinging frame hung with a pivot hinge at the bottom, the connection between the two being effected by radius rods, in the manner and for the purpose substantially as herein set forth and described.

WM. H. ROBERTSON.

Witnesses:
WM. VINE,
ROBT. ALLASON.